(12) United States Patent
Ochi et al.

(10) Patent No.: US 8,090,408 B2
(45) Date of Patent: Jan. 3, 2012

(54) PORTABLE WIRELESS DEVICE

(75) Inventors: Takahiro Ochi, Sendai (JP); Haruhiko Kakitsu, Sendai (JP)

(73) Assignee: Panasonic Corporation, Osaka (JP)

( * ) Notice: Subject to any disclaimer, the term of this patent is extended or adjusted under 35 U.S.C. 154(b) by 185 days.

(21) Appl. No.: 12/672,988

(22) PCT Filed: Aug. 10, 2007

(86) PCT No.: PCT/JP2007/065746
§ 371 (c)(1),
(2), (4) Date: Feb. 10, 2010

(87) PCT Pub. No.: WO2009/022387
PCT Pub. Date: Feb. 19, 2009

(65) Prior Publication Data
US 2011/0063779 A1 Mar. 17, 2011

(51) Int. Cl.
*H04M 1/00* (2006.01)
*H04B 1/38* (2006.01)
(52) U.S. Cl. .................................. 455/558; 455/575.7
(58) Field of Classification Search ............... 455/90.3, 455/558, 575.1, 575.7, 575.8, 347
See application file for complete search history.

(56) References Cited

U.S. PATENT DOCUMENTS

| | | | |
|---|---|---|---|
| 6,522,299 B2* | 2/2003 | Beard et al. | 455/575.7 |
| 6,834,810 B2 | 12/2004 | Maruyama | |
| 7,505,072 B2* | 3/2009 | Saitoh | 455/296 |
| 7,768,462 B2* | 8/2010 | Zhang et al. | 343/702 |
| 7,876,274 B2* | 1/2011 | Hobson et al. | 455/575.7 |
| 2001/0006902 A1 | 7/2001 | Ito | |

FOREIGN PATENT DOCUMENTS

| | | |
|---|---|---|
| JP | 10-154909 A | 6/1998 |
| JP | 2001-195553 A | 7/2001 |
| JP | 2003-006603 A | 1/2003 |
| JP | 2004-363848 A | 12/2004 |
| JP | 2005-033773 A | 2/2005 |
| JP | 2005-252876 A | 9/2005 |
| JP | 2006-222873 A | 8/2006 |

OTHER PUBLICATIONS

International Search Report mailed Sep. 4, 2007, in corresponding International Patent Application No. PCT/JP2007/065746, filed Aug. 10, 2007.

* cited by examiner

*Primary Examiner* — Quochien B Vuong
(74) *Attorney, Agent, or Firm* — Seed IP Law Group PLLC

(57) ABSTRACT

A portable wireless device has no externally projecting part even when a card type functional medium has been therein inserted, and allows downsizing and obtaining high antenna performance.

The portable wireless device includes a card slot (12) in a substrate (11) of a lower housing (10), and includes a slot cover (13) that can block an opening portion of the card slot (12). The slot cover (13) is integrally provided with a parasitic element (14). The parasitic element (14) is, when an SDIO card (100) is inserted, arranged so as to be in proximity substantially parallel with the antenna element (102) of the SDIO card (100), has an electrical length which is approximately one-half wavelength of a driving frequency of an RF circuit (101) of the SDIO card (100), and electromagnetically couples with the antenna element (102) to operate as a parasitic element.

7 Claims, 5 Drawing Sheets

PORTABLE WIRELESS DEVICE

TECHNICAL FIELD

The present invention relates to a portable wireless device that can be used by inserting a card type functional medium such as an SDIO card in a card slot.

BACKGROUND ART

Various memory cards loaded with flash memories have been put into practical use, and used for a variety of purposes. As one type of such memory cards, SD (Secure Digital) memory cards have been widely known. The SD memory cards are smaller in size than other memory cards such as PC cards, and have therefore spread as recording media to be used for portable terminal devices such as mobile phones and PDAs.

FIG. 9 is an external perspective view showing a mobile phone as an example of a conventional portable wireless device including a slot for inserting therein an SD memory card. For the mobile phone 5, an upper housing 90 including a liquid crystal display section 91 and a lower housing 80 having a radio circuit are configured so as to be foldable by a hinge portion 92. The mobile phone 5 has, at a side portion of the lower housing 80, a card slot 82 that can be blocked with a slot cover 83, and an SD memory card 500 can be inserted in and removably attached to the card slot 82.

In recent years, SD memory cards have also been diversified, and an SDIO (Secure Digital Input/Output) card with an I/O function has been the focus of attention. The SDIO card is a card type functional medium for which a wireless communication function such as Bluetooth (registered trademark), wireless LAN, or GPS is loaded on an SD memory card, and which is capable of transmitting and receiving data with a plurality of information processing devices. The SDIO card is configured inside with an RF circuit and an antenna element stored to perform wireless communications, and like the SD memory card, is fitted to a card slot of a portable wireless device.

An SDIO card is usually arranged so that its antenna element is located at an entrance side of the card slot 82 so that radio waves can be easily transmitted and received, and when the SDIO card is fitted to the card slot 82, the part of the antenna element is held in a state projecting from the lower housing 80 of the mobile phone 5 (see Patent Document 1, for example).

Moreover, there has been proposed an example where, in order to prevent a part of an SDIO card where an antenna element is located from projecting from the lower housing 80, an antenna is built in an eject lever that is operated to eject the SDIO card (see Patent Document 2, for example).

Patent Document 1: JP-A-2003-6603
Patent Document 2: JP-A-2001-195553

DISCLOSURE OF THE INVENTION

Problems to be Solved by the Invention

However, in the example of Patent Document 1 mentioned above, the part of the antenna element of the SDIO card projecting from the portable wireless device is likely to receive external force in use, and may be damaged. Moreover, as a result of the antenna part of the SDIO card projecting from the mobile phone, for example, the slot cover 83 remains open as shown in FIG. 9, and fails to protect the SDIO card that has been inserted in the card slot 82. Moreover, there is also a problem that the projecting part of the SDIO card and the opened slot cover become a hindrance when the portable wireless device is operated or carried, and which hinders portability.

Moreover, if an antenna element is built in an SDIO card so that the antenna part is not projected, antenna performance significantly deteriorates, and a problem thus occurs such that the wireless communication function loaded on the card cannot be sufficiently fulfilled.

Further, in the example described in Patent Document 2, it is necessary to provide on the portable wireless device an eject lever to eject the SDIO card, which thus makes the configuration of the portable wireless device complicated, and prevents downsizing.

The present invention has been made in view of the above circumstances, and an object thereof is to provide a portable wireless device that has no externally projecting part even when a card type functional medium has been therein inserted, and allows downsizing while obtaining high antenna performance.

Means for Solving the Problems

A portable wireless device of the present invention includes: a card slot that allows fitting a card type functional medium with a communication function in a housing; a slot cover that covers an opening portion of the card slot when the card type functional medium is fitted and not fitted; and a current carrying section that is integrally provided in the slot cover, electromagnetically couples with an antenna portion provided in the card type functional medium with the card type functional medium fitted to the card slot, and operates as a parasitic element of the antenna portion.

For this, when performing wireless communications using a card type functional medium, the current carrying section provided in the slot cover electromagnetically couples with the antenna portion of the card type functional medium to operate as a parasitic element, and thus there is no externally projecting part even when the card type functional medium has been therein inserted, and it becomes possible to realize downsizing while obtaining high antenna performance without hindering portability.

Moreover, the present invention includes the portable wireless device mentioned above, wherein the current carrying section is arranged so as to be substantially parallel with a longer side of the opening portion of the card slot when the slot cover is closed.

This makes the electromagnetic coupling between the antenna portion provided in the card type functional medium and current carrying section easy and reliable, and it becomes possible to obtain high antenna performance.

Moreover, the present invention includes the portable wireless device mentioned above, wherein the current carrying section is electrically connected at a part thereof with a ground portion of the portable wireless device and grounded.

For this, the current carrying section to serve as a parasitic element operates as a ground wire, and a current due to radio waves when being transmitted and received flows to the ground portion via the current carrying section, so that it becomes possible to obtain high antenna performance.

Moreover, the present invention includes the portable wireless device mentioned above, including an electrical circuit to connect the current carrying section and a ground portion of the portable wireless device, wherein a part of the current carrying section is grounded via the electrical circuit.

For this, adjusting the electrical circuit makes it easy to design the element length of the current carrying section to serve as a parasitic element according to a using frequency band, such as approximately one-half wavelength of radio waves to be used, so that it becomes possible to obtain high antenna performance.

Moreover, the present invention includes the portable wireless device mentioned above, wherein the electrical circuit is formed of an LC circuit having an inductor and a capacitor.

For this, adjusting a value of the inductor or capacitor makes it easy to design the element length of the current carrying section to serve as a parasitic element according to a using frequency band, such as approximately one-half wavelength of radio waves to be used, so that it becomes possible to obtain high antenna performance.

Moreover, the present invention includes the portable wireless device mentioned above, wherein the electrical circuit is formed of an LC switching circuit having an inductor, a capacitor, and a switching element and can connect while switching the inductor and capacitor by the switching element.

For this, adjusting a value of the inductor or capacitor makes it easy to design the element length of the current carrying section to serve as a parasitic element according to a using frequency band, such as approximately one-half wavelength of radio waves to be used, and moreover, when the using frequency has changed due to switching of the switching element, it becomes possible to switch the element length of the current carrying section.

A portable wireless device of the present invention includes: a card slot that allows fitting a card type functional medium with a communication function in a housing; a slot cover that covers an opening portion of the card slot when the card type functional medium is fitted and not fitted; a current carrying section that is integrally provided in the slot cover, and connected with the card type functional medium with the card type functional medium fitted to the card slot to operate at least at a part thereof as a part or a whole of an antenna element of the card type functional medium; and a connecting section that electrically connects the current carrying section and the card type functional medium with the card type functional medium fitted to the card slot.

For this, when performing wireless communications using a card type functional medium, the current carrying section provided in the slot cover operates as an antenna element, and thus there is no externally projecting part even when the card type functional medium has been therein inserted, and it becomes possible to realize downsizing while obtaining high antenna performance without hindering portability.

Effects of the Invention

According to the present invention, a portable wireless device that has no externally projecting part even when a card type functional medium has been therein inserted, and allows downsizing while obtaining high antenna performance can be provided.

Figure 1:
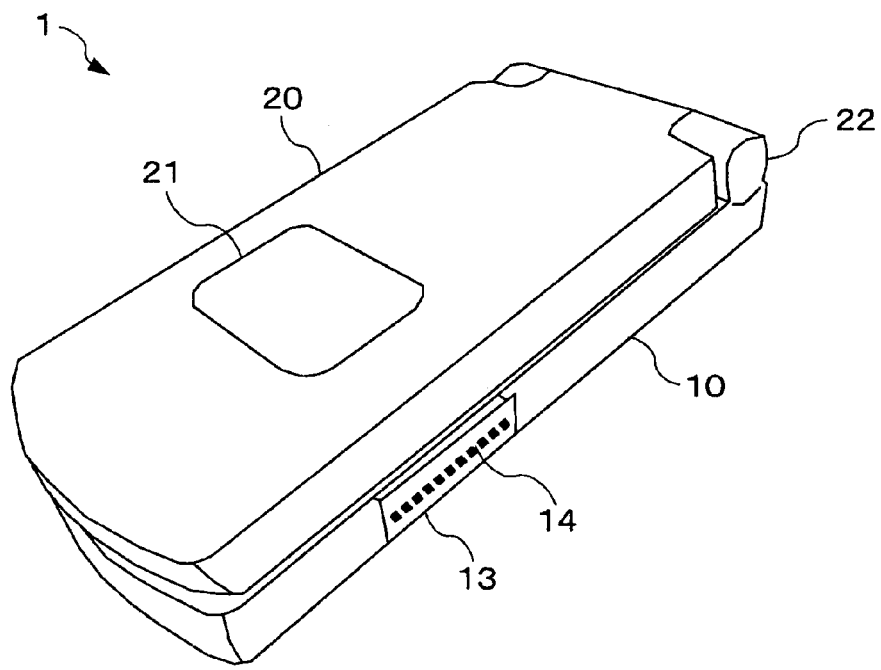
FIG. 1 An external perspective view showing a schematic configuration of a portable wireless device according to a first embodiment of the present invention.

DESCRIPTION OF REFERENCE NUMERALS 1, 2 Mobile phone
10, 30, 40, 50, 60, 70 Lower housing
11, 31, 41, 51, 61, 71 Substrate
12, 72 Card slot
13, 33, 73 Slot cover
14, 34 Parasitic element
20 Upper housing
42 Electrical circuit
52 LC circuit
62 LC switching circuit
75, 102 Antenna element
100, 200 SDIO card
101, 201 RF circuit
103, 203 Connection terminal

BEST MODES FOR CARRYING OUT THE INVENTION

First Embodiment

FIG. 1 an external perspective view showing a schematic configuration of a portable wireless device according to a first embodiment of the present invention. The portable wireless device 1 of the first embodiment has a lower housing 10 having a radio circuit, an upper housing 20 including a liquid crystal display section 21, and a hinge portion 22 that foldably couples the lower housing 10 and the upper housing 20 at one end portion of each.

On a side face of the lower housing 10, a card slot that allows inserting and fitting in the housing an SDIO card 100 to be described later, and a slot cover 13 that is attached, in order to block an opening portion of the card slot, via a turning portion (not shown) are provided.

Figure 2:
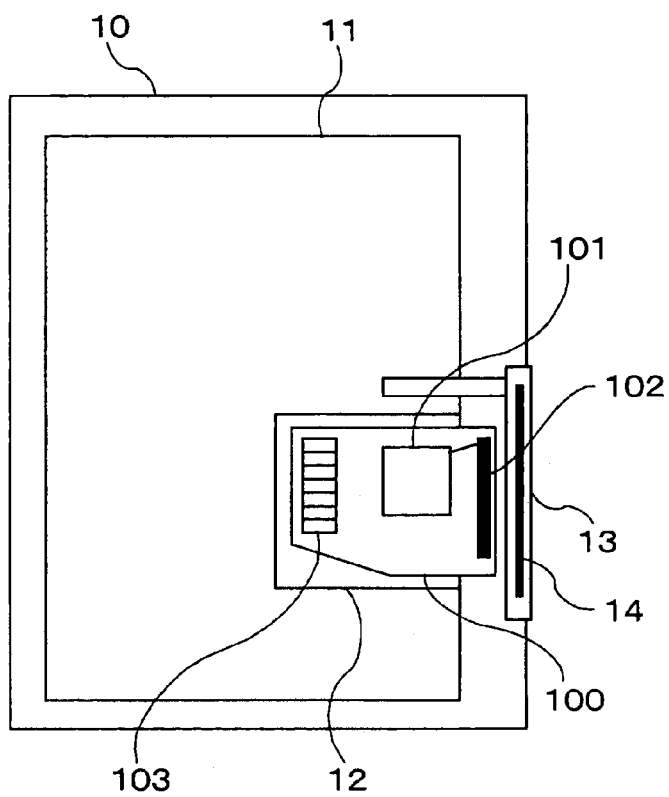
FIG. 2 A plan view showing a schematic configuration of the interior of a lower housing in the first embodiment.

FIG. 2 is a plan view showing a schematic configuration of the interior of the lower housing 10 in the first embodiment. In FIG. 2, a state of the interior of the lower housing 10 viewed transparently is shown. The lower housing 10 includes a substrate 11, a card slot 12 that is mounted on the substrate 11 and for inserting therein the SDIO card 100, and a slot cover 13 that blocks an opening portion of the card slot 12 to prevent intrusion of foreign matter such as dust.

The SDIO card 100, which is a card type functional medium loaded with a wireless communication function, is configured with an RF circuit 101 being a high-frequency circuit to perform wireless communications, an antenna element 102 being an antenna section connected with the RF circuit 101 by a wiring pattern and arranged at an end portion closer to the opening portion of the card slot 12, and a connection terminal 103 being an interface section that is provided at an end portion opposite to the antenna element 102, and performs input and output of power and signals with the substrate 11.

In the slot cover 13, a parasitic element 14 acting as a wave director of the antenna section (antenna element 102) to be loaded on the SDIO card 100 is integrally provided. The parasitic element 14 is, inside of the slot cover 13 or on an inner surface or the like, disposed by integral molding or the like.

The parasitic element 14 is formed of a conductive member such as a conductive thin film or wire rod so as to function as a current carrying section, arranged substantially parallel with a longer side of the opening portion of the card slot 12, and located in proximity substantially parallel with the antenna element 102 when the SDIO card 100 is inserted in the card slot 12, and thus is capable of electromagnetic coupling with the antenna element 102. The parasitic element 14 operates as a parasitic element as a result of electromagnetic coupling with the antenna element 102. It is desirable that the electrical length of the parasitic element 14 is approximately one-half wavelength of a driving frequency of the RF circuit 101 loaded on the SDIO card 100.

Examples of a wireless communication system that can be used in the SDIO card 100 include Bluetooth (registered trademark). Bluetooth, which is for performing short-range wireless communications within 10 m using a 2.4 GHz band, is an optimal communication system for portable wireless devices and the like that require a reduction in power consumption and downsizing. Alternatively, a wireless LAN IEEE 801.11a/b/g or the like may be applied as the wireless communication system.

Next, description will be given of operation when performing wireless communications using the SDIO card 100 in the portable wireless device 1 according to the present embodiment configured as in the above.

The SDIO card 100, as shown in FIG. 2, in a posture with its one end having the connection terminal 103 headed, is inserted in the card slot 12 and fitted, and the opening portion of the card slot 12 is closed with the slot cover 13. In this way, the connection terminal 103 of the SDIO card 100 is electrically connected with the substrate 11 of the lower housing 10 to reach a state capable of input of power and input and output of signals. Moreover, the antenna element 102 and the parasitic element 14 integrated in the slot cover 13 are approximated at this time to reach an electromagnetically coupled state.

Then, by the RF circuit 101 that is controlled by a controller (not shown) loaded on the SDIO card 100, the antenna element 102 is excited in an electromagnetic interaction with the parasitic element 14 to perform transmission of radio waves. Moreover, radio waves efficiently received by the antenna element 102 through the electromagnetic interaction with the parasitic element 14 are converted to an electrical signal in the RF circuit 101, and the electrical signal is transmitted to the substrate 11 via the connection terminal 103.

In the present embodiment, the antenna element 102 and the parasitic element 14 integrated in the slot cover 13 are approximated and electromagnetically coupled, so that a current concentrates in the parasitic element 14 at the time of transmission and reception. Therefore, an electromagnetic coupling between the antenna element 102 and the substrate 11 is suppressed, and the transmission power when transmitting from the antenna element 102 or the reception sensitivity when receiving at the antenna element 102 is improved more than that with no parasitic element 14. Accordingly, providing the parasitic element 14 in the slot cover 13 allows obtaining high antenna performance while wireless communications are performed.

Moreover, arranging at this time the parasitic element 14 provided in the slot cover 13 substantially parallel with a longer side of the opening portion of the card slot 12 makes the electromagnetic coupling between the antenna element 102 and the parasitic element 14 easy, so that it becomes possible to exhibit high antenna performance.

Figure 3:
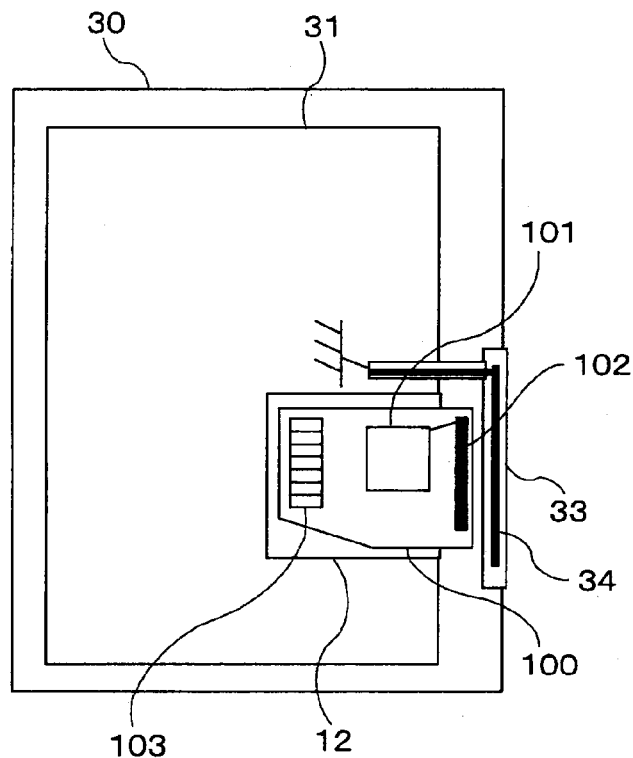
FIG. 3 A plan view showing a schematic configuration of the interior of a lower housing showing a first modification of the present embodiment.

FIG. 3 is a plan view showing a schematic configuration of the interior of a lower housing showing a first modification of the present embodiment. For the lower housing 30 of the first modification, a parasitic element 34 formed in an inverted L-shape is integrated with a slot cover 33, and one end thereof is electrically connected to a ground portion of the substrate 31 and grounded. For this, the parasitic element 34 operates as a ground wire, and a current due to radio waves when being transmitted and received flows to the ground portion via the parasitic element 34, so that characteristics of the antenna elements 102 are improved.

Figure 4:
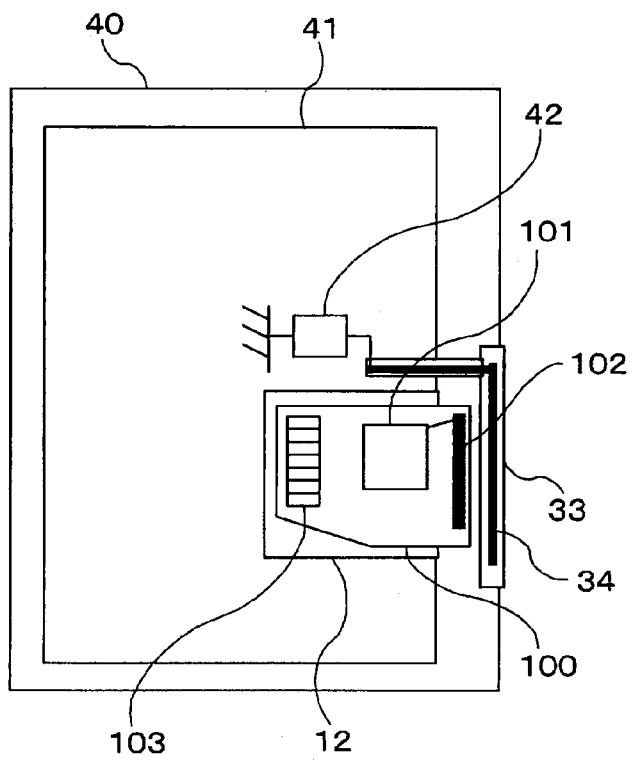
FIG. 4 A plan view showing a schematic configuration of the interior of a lower housing showing a second modification of the present embodiment.

Moreover, FIG. 4 is a plan view showing a schematic configuration of the interior of a lower housing showing a second modification of the present embodiment. For the lower housing 40 of the second modification, a parasitic element 34 formed in an inverted L-shape is integrated with a slot cover 33, and one end thereof is electrically connected to a ground portion of a substrate 41 via an electrical circuit 42 and grounded. Due to this configuration, adjusting the electrical circuit 42 makes it easy to design the element length of the parasitic element 34 according to a using frequency band, such as approximately one-half wavelength of a driving frequency of the RF circuit 101, so that transmission and reception characteristics of radio waves are improved.

Figure 5:
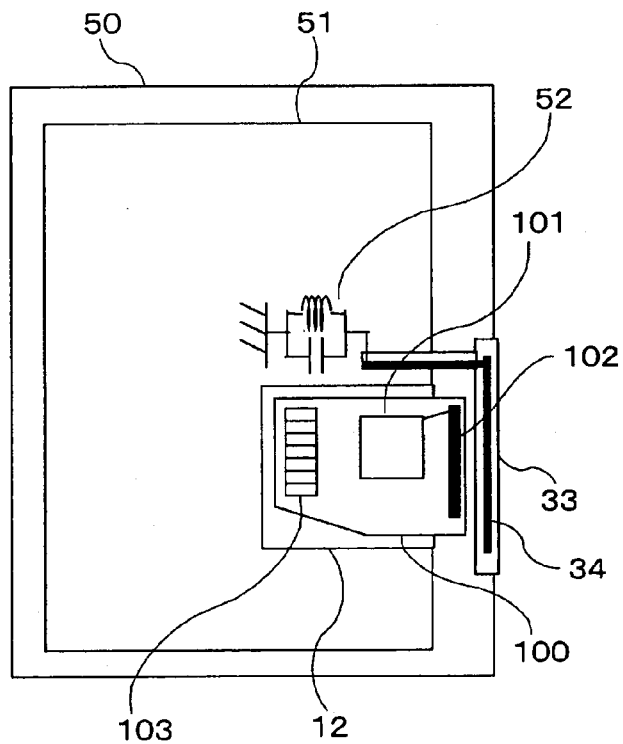
FIG. 5 A plan view showing a schematic configuration of the interior of a lower housing showing a third modification of the present embodiment.

Further, FIG. 5 is a plan view showing a schematic configuration of the interior of the lower housing showing a third modification of the present embodiment. For the lower housing 50 of the third modification, one end of a parasitic element 34 being in an inverted L-shape integrated with a slot cover 33 is electrically connected to a ground portion of a substrate 51 via an LC circuit 52 for which an inductor and a capacitor are connected in parallel. Due to this configuration, adjusting a value of the inductor or capacitor in the LC circuit 52 makes it easy to design the element length of the parasitic element 34 according to a using frequency band, such as approximately one-half wavelength of a driving frequency of the RF circuit 101, so that the radiation efficiency of radio waves can be improved.

Figure 6:
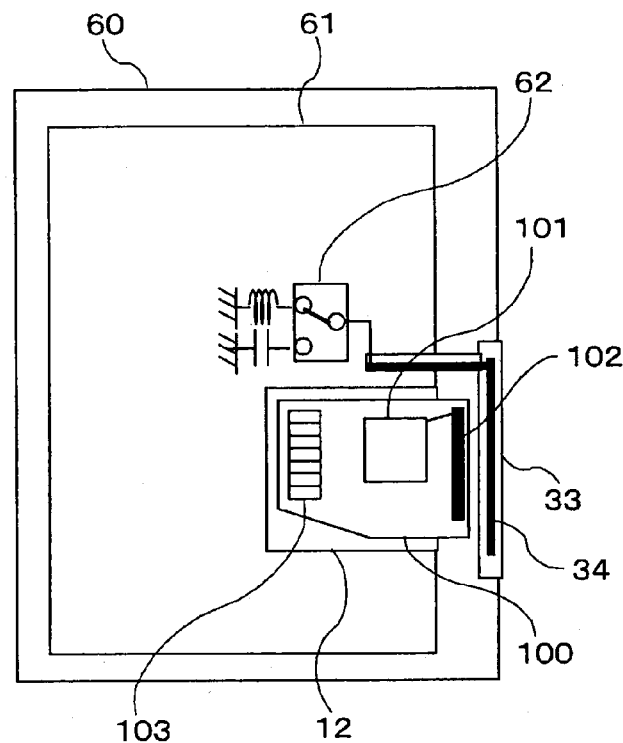
FIG. 6 A plan view showing a schematic configuration of the interior of a lower housing showing a fourth modification of the present embodiment.

Moreover, FIG. 6 is a plan view showing a schematic configuration of the interior of a lower housing showing a fourth modification of the present embodiment. For the lower housing 60 of the fourth modification, one end of a parasitic element 34 being in an inverted L-shape integrated with a slot cover 33 is electrically connected to a ground portion of a substrate 61 via an LC switching circuit 62. The LC switching circuit 62 is structured so that an inductor and a capacitor connected in parallel can be switched over by a switching element. Due to this configuration, adjusting a value of the inductor or capacitor makes it easy to design the element length of the parasitic element 34 according to a using frequency band, such as approximately one-half wavelength of a driving frequency of the RF circuit 101, and moreover, when the driving frequency of the RF circuit 101 has changed due to switching of the switching element of the LC switching circuit 62, it becomes possible to switch the element length of the parasitic element 34.

As has been described in the above, a portable wireless device according to the first embodiment has a configuration where a card slot 12 for inserting therein an SDIO card 100 is provided in a lower housing 10, and in a slot cover 13 for blocking an opening portion of the card slot 12, a parasitic element 14 is provided in an integrated manner substantially parallel with a longer side of the opening portion of the card slot 12.

This allows closing the slot cover 13 without the SDIO card 100 projecting when the SDIO card 100 is inserted in the card slot 12, and the antenna element 102 of the SDIO card 100 and the parasitic element 14 are in this state approximated substantially in parallel to each other and electromagnetically coupled, and high antenna performance can be performed when wireless communications are performed. Moreover, as a result of the parasitic element 14 being provided integrated in the slot cover 13, the antenna part of the SDIO card 100 never projects from the housing, so that operability and portability can be improved, and it is possible to realize downsizing while obtaining predetermined antenna performance. Thus, it is possible to load a card type functional medium having a wireless communication function that exhibits high antenna performance, without hindering downsizing and portability.

Moreover, connecting one end of a parasitic element to a ground of a substrate to be a ground wire allows improving antenna characteristics. Further, providing between one end of the parasitic element and the ground of the substrate an electrical circuit such as an LC circuit, or an LC switching circuit that can connect while switching elements by a switch makes it possible to set the electrical length of the parasitic element to approximately one-half wavelength of a driving frequency of the RF circuit 101, so that the radiation efficiency of radio waves can be improved.

Second Embodiment

Figure 7:
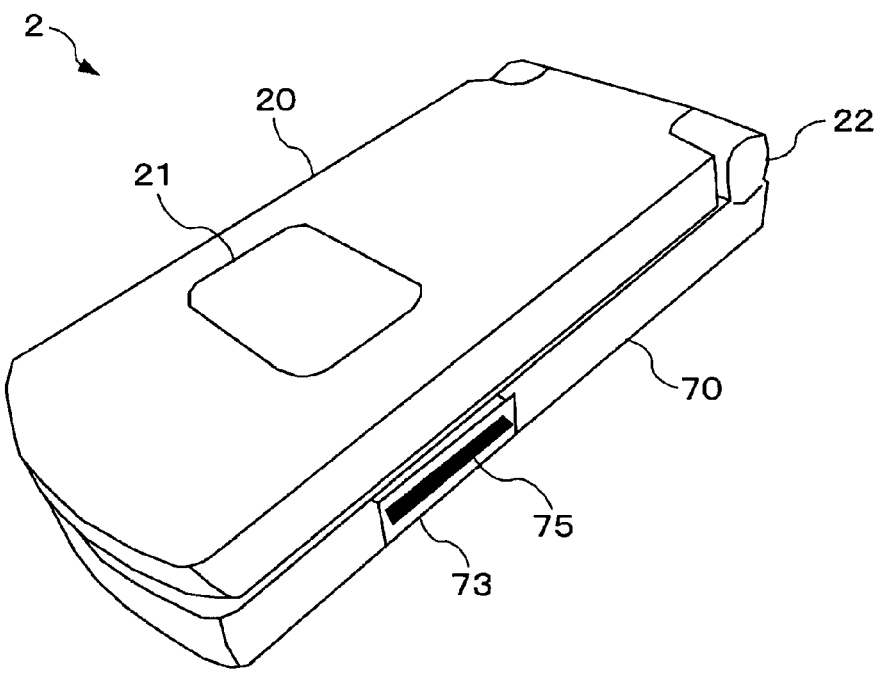
FIG. 7 An external perspective view showing a schematic configuration of a portable wireless device according to a second embodiment of the present invention.

FIG. 7 is an external perspective view showing a schematic configuration of a portable wireless device according to a second embodiment of the present invention. Components that are in common with those of the first embodiment shown in FIG. 1 are denoted by the same reference numerals.

The portable wireless device 2 of the second embodiment has a lower housing 70 having a radio circuit, an upper housing 20 including a liquid crystal display section 21, and a hinge portion 22 that foldably couples both housings 70 and 20 at one end portion of each.

On a side face of the lower housing 70, a card slot that allows inserting and fitting in the housing an SDIO card 200 to be described later, and a slot cover 73 that is attached, in order to block an opening portion of the card slot, via a turning portion (not shown) are provided.

Figure 8:
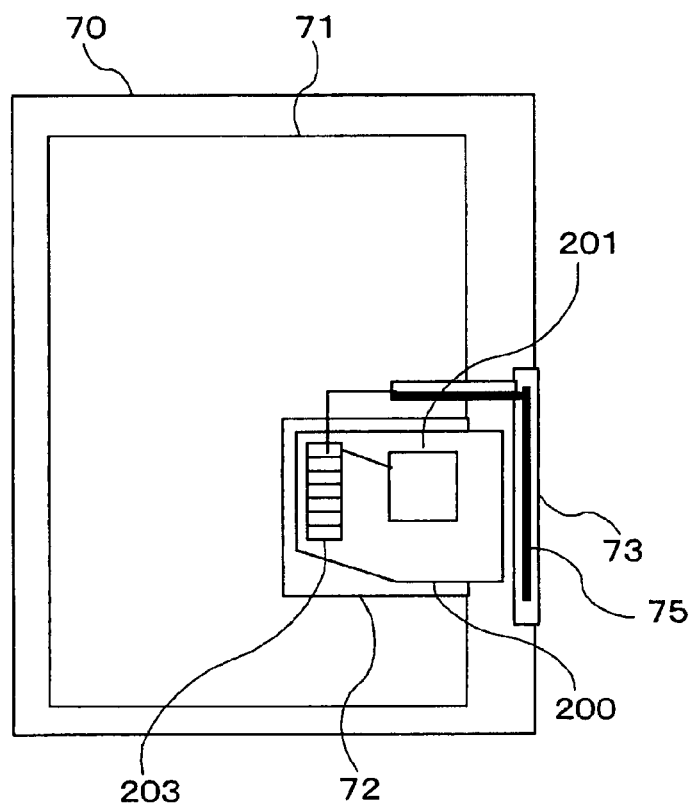
FIG. 8 A plan view showing a schematic configuration of the interior of a lower housing in the second embodiment.
Figure 9:
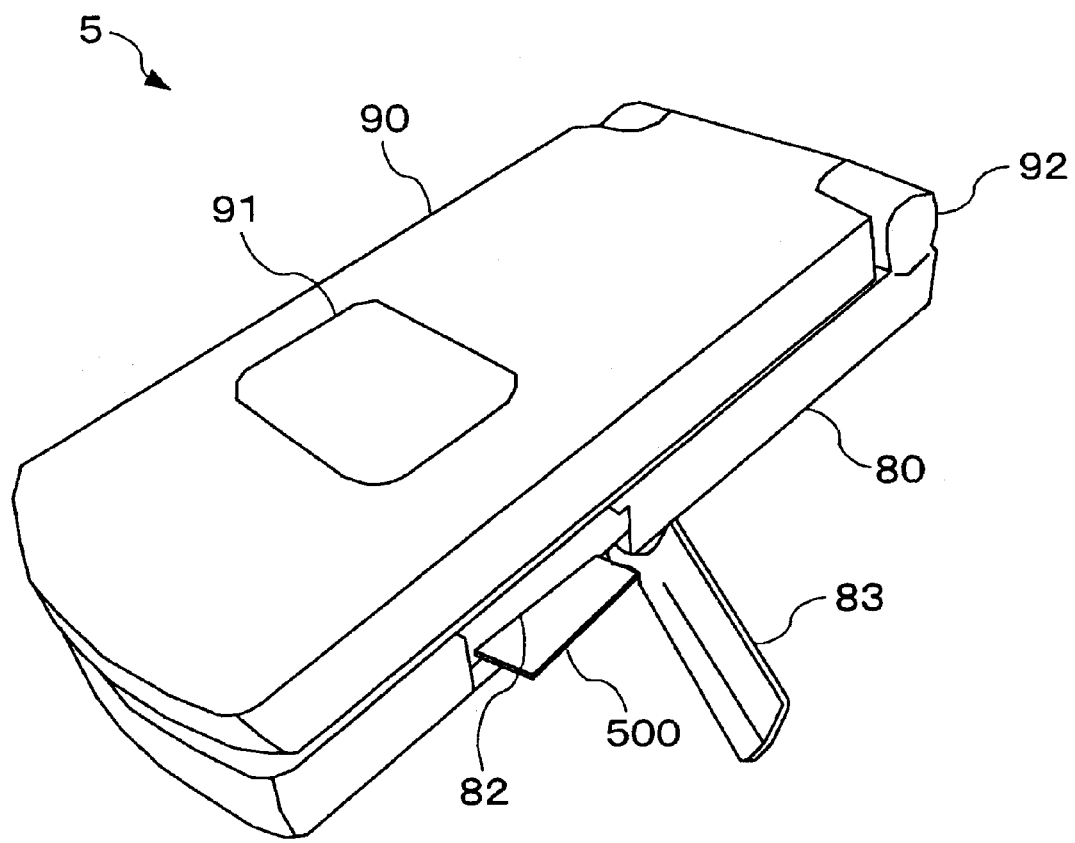
FIG. 9 An external perspective view showing a configuration example of a conventional portable wireless device.

FIG. 8 is a plan view showing a schematic configuration of the interior of the lower housing 70 in the second embodiment. In FIG. 8, a state of the interior of the lower housing 70 viewed transparently is shown. The lower housing 70 includes a substrate 71, a card slot 72 that is mounted on the substrate 71 and for inserting therein the SDIO card 200, and a slot cover 73 that blocks an opening portion of the card slot 72 to prevent intrusion of foreign matter such as dust.

The SDIO card 200, which is a card type functional medium loaded with a wireless communication function, is configured with an RF circuit 201 being a high-frequency circuit to perform wireless communications, and a connection terminal 203 being an interface section connected with the RF circuit 201 by a wiring pattern and provided at an end portion opposite to the opening portion side of the card slot 72.

Examples of a wireless communication system that can be used in the SDIO card 200 include, as in the first embodiment, Bluetooth (registered trademark) and a wireless LAN IEEE 801.11a/b/g or the like.

In the slot cover 73, an antenna element 75 to be electrically connected with the connection terminal 203 of the SDIO card 200 is integrally provided. The connection terminal 203 is provided as a connection section to perform input and output of power and signals with the substrate 71, and electrically connect the antenna element 75 provided integrated with the slot cover 73. The antenna element 75 is, inside of the slot cover 73 or on an inner surface or the like, disposed by integral molding or the like. The antenna element 75 is formed of a conductive member such as a conductive thin film or wire rod so as to function as a current carrying section, and its electrical length is desirably approximately one-half wavelength or approximately one-fourth wavelength of a driving frequency of the RF circuit 201 loaded on the SDIO card 200. The antenna element 75 is connected with the RF circuit 201 via the connection terminal 203 of the SDIO card 200 when the SDIO card 200 is inserted in the card slot 72, and operates at least at a part thereof as a part or a whole of an antenna element of the SDIO card 200.

Next, description will be given of operation when performing wireless communications using the SDIO card 200 in the portable wireless device 2 according to the present embodiment configured as in the above.

The SDIO card 200, as shown in FIG. 8, in a posture with its one end having the connection terminal 203 headed, is inserted in the card slot 72 and fitted, and the opening portion of the card slot 72 is closed with the slot cover 73. In this way, the connection terminal 203 of the SDIO card 200 is electrically connected with the substrate 71 of the lower housing 70 and the antenna element 75 provided in the slot cover 73 to reach a state capable of input of power and input and output of signals.

Then, by the RF circuit 201 that is controlled by a controller (not shown) loaded on the SDIO card 200, the antenna element 75 is excited to perform transmission of radio waves. Moreover, radio waves are efficiently received by the antenna element 75 and converted to an electrical signal in the RF circuit 201, and transmitted to the substrate 71 via the connection terminal 203.

In the present embodiment, the antenna element 75 is provided integrated in the slot cover 73, and thus the antenna element 75 never projects from the lower housing 70, which allows obtaining high antenna performance while wireless communications are performed without hindering downsizing and portability.

As has been described in the above, a portable wireless device according to the second embodiment has a configuration where a card slot 72 for inserting therein an SDIO card 200 is provided in a lower housing 70, and in a slot cover 73 for blocking an opening portion of the card slot 72, an antenna element 75 is provided in an integrated manner.

This allows closing the slot cover 73 without the SDIO card 200 projecting when the SDIO card 200 is inserted in the card slot 72, and the SDIO card 200 and the antenna element 75 are in this state connected to each other, so that operability and portability are excellent, and downsizing is realized while high antenna performance can be obtained when wireless communications are performed. Thus, it is possible to load a card type functional medium having a wireless communication function that exhibits high antenna performance, without hindering downsizing and portability.

The present invention is not limited to the matters provided in the above embodiments, and alterations and applications, which would be made by those skilled in the art based on the description of the specification and the well-known technologies, are also intended by the present invention, and are contained in a scope over which protection is sought.

INDUSTRIAL APPLICABILITY

The present invention has an effect of having no externally projecting part even when a card type functional medium has been therein inserted and allowing downsizing while obtaining high antenna performance, and is useful as a portable wireless device or the like, such as a mobile phone or a portable terminal device (PDA), that can be used by inserting a card type functional medium such as an SDIO card in a card slot.

The invention claimed is:

1. A portable wireless device comprising:
   a card slot that allows fitting a card type functional medium with a communication function in a housing;
   a slot cover that covers an opening portion of the card slot when the card type functional medium is fitted and not fitted; and
   a current carrying section that is integrally provided in the slot cover, electromagnetically couples with an antenna portion provided in the card type functional medium with the card type functional medium fitted to the card slot, and operates as a parasitic element of the antenna portion.

2. The portable wireless device according to claim 1, wherein
   the current carrying section is arranged so as to be substantially parallel with a longer side of the opening portion of the card slot when the slot cover is closed.

3. The portable wireless device according to claim 1, wherein
   the current carrying section is electrically connected at a part thereof with a ground portion of the portable wireless device and grounded.

4. The portable wireless device according to claim 1, comprising an electrical circuit to connect the current carrying section and a ground portion of the portable wireless device, wherein a part of the current carrying section is grounded via the electrical circuit.

5. The portable wireless device according to claim 4, wherein the electrical circuit is formed of an LC circuit having an inductor and a capacitor.

6. The portable wireless device according to claim 4, wherein
   the electrical circuit is formed of an LC switching circuit having an inductor, a capacitor, and a switching element, and can connect while switching the inductor and capacitor by the switching element.

7. A portable wireless device comprising:
   a card slot that allows fitting a card type functional medium with a communication function in a housing;
   a slot cover that covers an opening portion of the card slot when the card type functional medium is fitted and not fitted;
   a current carrying section that is integrally provided in the slot cover, and connected with the card type functional medium with the card type functional medium fitted to the card slot to operate at least at a part thereof as a part or a whole of an antenna element of the card type functional medium; and
   a connecting section that electrically connects the current carrying section and the card type functional medium with the card type functional medium fitted to the card slot.

* * * * *